(12) United States Patent
Schmidt et al.

(10) Patent No.: US 11,426,677 B2
(45) Date of Patent: Aug. 30, 2022

(54) PLANT AND PROCESS FOR SEPARATING SULFUR-CONTAINING COMPONENTS FROM LADEN METHANOL

(71) Applicant: L'Air Liquide, Société Anonyme pour l'Etude et l'Exploitation des Procédés Georges Claude, Paris (FR)

(72) Inventors: Sophia Schmidt, Frankfurt am Main (DE); Alfred Gubrinski, Erzhausen (DE); Sharon Corbet, Frankfurt (DE); Hincal Leichner, Hochheim (DE)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 60 days.

(21) Appl. No.: 16/758,673

(22) PCT Filed: Oct. 5, 2018

(86) PCT No.: PCT/EP2018/025257
§ 371 (c)(1),
(2) Date: Apr. 23, 2020

(87) PCT Pub. No.: WO2019/081064
PCT Pub. Date: May 2, 2019

(65) Prior Publication Data
US 2020/0346133 A1 Nov. 5, 2020

(30) Foreign Application Priority Data
Oct. 24, 2017 (EP) .................... 17400060

(51) Int. Cl.
*B01D 3/14* (2006.01)
*B01D 5/00* (2006.01)
(Continued)

(52) U.S. Cl.
CPC .............. *B01D 5/006* (2013.01); *B01D 3/007* (2013.01); *B01D 3/14* (2013.01); *B01D 5/0003* (2013.01);
(Continued)

(58) Field of Classification Search
CPC .......... C10K 1/004; C10K 1/16; B01D 3/007; B01D 3/14; B01D 5/0003; B01D 5/006;
(Continued)

(56) References Cited

U.S. PATENT DOCUMENTS 2,549,290 A * 4/1951 Congdon ........... C10M 169/041
203/42
3,505,784 A * 4/1970 Hochgesand et al. ... C10K 1/16
95/161
(Continued)

FOREIGN PATENT DOCUMENTS

DE 196 10 485 9/1997
EP 0 054 783 6/1982
EP 2 228 119 9/2010

OTHER PUBLICATIONS

Kohl, A.L. et al., Gas purification, Aug. 28, 1997, Gulf Publishing Co., Houston, TX 77019, 189-190, 196.
(Continued)

*Primary Examiner* — Jonathan Miller
(74) *Attorney, Agent, or Firm* — Elwood L. Haynes

(57) ABSTRACT

Plant and process for separation of sulfur-containing components, $H_2S$, COS and mercaptans from methanol which is used as absorbent within the Rectisol process by hot regeneration of the methanol laden in the absorption and an additional step for separation of the mercaptans from the methanol by stripping.

2 Claims, 1 Drawing Sheet

(51) Int. Cl.
*B01D 3/00* (2006.01)
*B01D 19/00* (2006.01)
*B01D 53/14* (2006.01)
*C10K 1/00* (2006.01)
*C10K 1/16* (2006.01)

(52) U.S. Cl.
CPC .......... *B01D 5/009* (2013.01); *B01D 5/0039* (2013.01); *B01D 19/0005* (2013.01); *B01D 53/1425* (2013.01); *C10K 1/004* (2013.01); *C10K 1/16* (2013.01); *B01D 2252/2021* (2013.01); *B01D 2257/304* (2013.01); *B01D 2257/306* (2013.01); *B01D 2257/308* (2013.01); *B01D 2257/504* (2013.01)

(58) Field of Classification Search
CPC .. B01D 5/0039; B01D 5/009; B01D 19/0005; B01D 53/1425; B01D 2252/2021; B01D 2257/304; B01D 2257/306; B01D 2257/308; B01D 2257/504
See application file for complete search history.

(56) References Cited

U.S. PATENT DOCUMENTS

| | | | | |
|---|---|---|---|---|
| 4,332,596 | A | 6/1982 | Ranke et al. | |
| 4,430,316 | A | 2/1984 | Ranke et al. | |
| 5,062,270 | A * | 11/1991 | Haut | B01D 53/1456 62/629 |
| 5,346,593 | A * | 9/1994 | Cialkowski | B01D 3/146 203/18 |
| 5,782,958 | A * | 7/1998 | Rojey | C10L 3/102 95/192 |
| 7,803,271 | B2 * | 9/2010 | Magne-Drisch | C01B 17/0456 208/343 |
| 8,206,489 | B2 * | 6/2012 | Cadours | B01D 53/1425 95/179 |
| 8,377,403 | B2 * | 2/2013 | Mak | C01B 32/50 423/242.1 |
| 8,529,857 | B2 * | 9/2013 | Sieder | B01D 53/1456 423/228 |
| 10,933,367 | B2 * | 3/2021 | Dowdle | B01D 53/1462 |
| 10,940,432 | B2 * | 3/2021 | Dowdle | B01D 53/1456 |
| 10,960,349 | B2 * | 3/2021 | Sarron | B01D 3/143 |
| 2013/0139687 | A1 * | 6/2013 | Weiss | B01D 53/1493 95/171 |

OTHER PUBLICATIONS

Ullmann's Encyclopedia of Industrial Chemistry, Physical absorption processes, 6th ed. vol. 15, 399-407.
International Search Report and Written Opinion for corresponding PCT/EP2018/025257, dated Dec. 12, 2018.

* cited by examiner

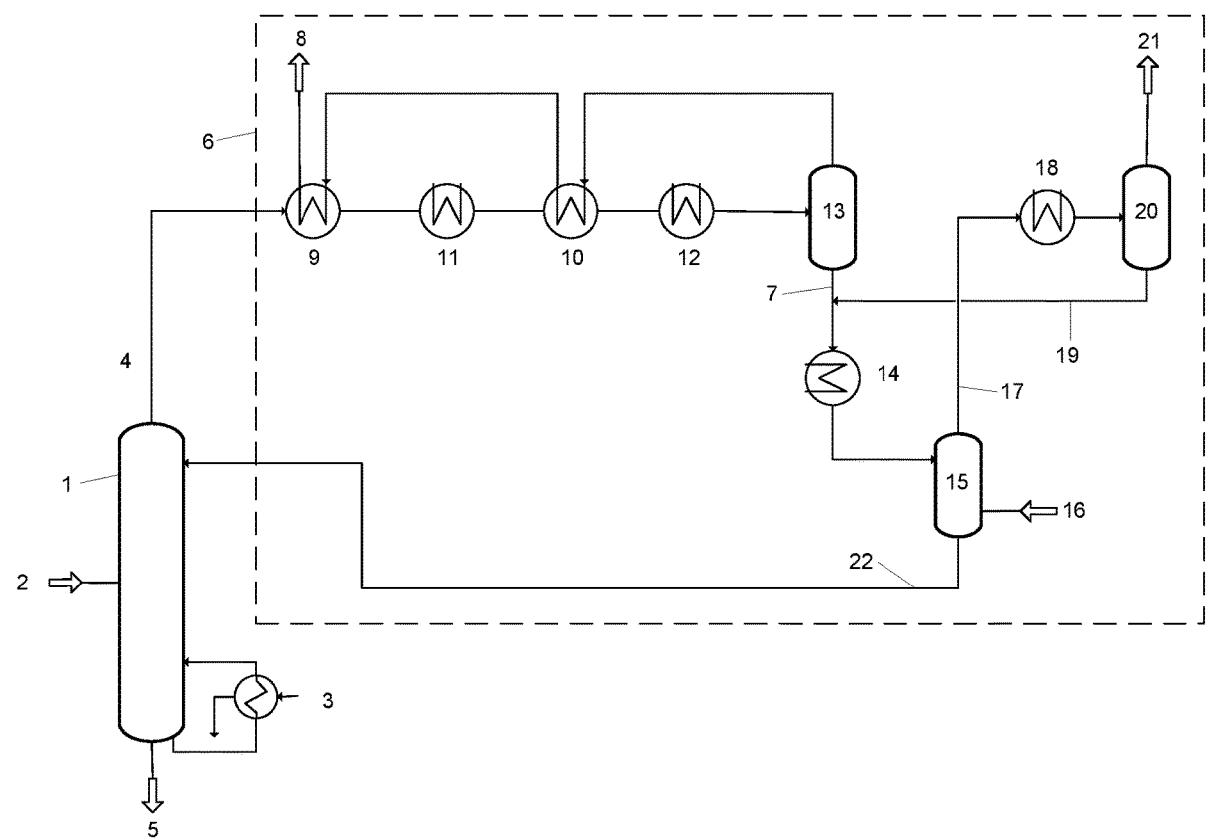

PLANT AND PROCESS FOR SEPARATING SULFUR-CONTAINING COMPONENTS FROM LADEN METHANOL

CROSS REFERENCE TO RELATED APPLICATIONS

This application is a 371 of International Patent Application PCT/EP2018/025257, filed Oct. 5, 2018, which claims priority to European Patent Application EP 174000604 filed Oct. 24, 2017, the entire contents of which are incorporated herein by reference.

BACKGROUND

Field of the Invention

The invention relates to a plant for separation of sulfur-containing components from methanol that has been used as absorbent for scrubbing of synthesis gas, comprising
  a distillation column comprising a feed for the introduction of the laden methanol, an outlet for the methanol that has been freed of its load, an outlet for the top product, a feed for the return of the top product, internals for mass transfer, a heat exchanger for the introduction of heat into the methanol,
  a circuit for the top product, comprising heat exchangers for heat exchange between the top product before and after its condensable components have been condensed out, heat exchangers for the cooling of the top product by cooling water, heat exchangers for the cooling of the top product by means of a coolant circuit, and liquid separators for separation of the condensate from the top product.

The invention likewise relates to the use of such a plant for treatment of methanol which has been used as absorbent in a plant for separation of carbon dioxide and sulfur-containing accompanying gases from a crude synthesis gas.

The invention further relates to a process for separating sulfur-containing components including $H_2S$, COS and mercaptans from a liquid phase comprising mainly methanol. In the context of this description, the mercaptans may also include thiophenes.

State of the Art

Plants of this kind are known; they are often used for separation of sulfur-containing components from methanol that has been used as absorbent in a plant for separation of carbon dioxide and sulfur-containing accompanying gases from a crude synthesis gas.

The plants for separation of the accompanying gases from a crude synthesis gas frequently work by what is called the Rectisol process, the principles of which are described in Ullmann's Encyclopedia of Industrial Chemistry, 6th ed. vol. 15, p. 399 ff. This process is used to free crude synthesis gas, consisting mainly of CO and $H_2$ and produced by partial oxidation of heavy oils, petroleum coke, waste products or by coal/oil residue gasification, of accompanying gases. The Rectisol process uses cryogenic methanol as absorbent and exploits the property of methanol that its absorptivity for the accompanying substances increases sharply with decreasing temperature, while its absorptivity for CO and $H_2$ remains virtually constant.

In the case of the Rectisol process, a distinction is made between the standard Rectisol process and the selective Rectisol process; the present invention relates to the selective process as shown in FIG. 46 of the above-cited reference.

The unwanted accompanying substances that are separated from the synthesis gas by the Rectisol process are mainly the accompanying gases carbonyl sulfide (COS), hydrogen sulfide ($H_2S$) and carbon dioxide ($CO_2$), but mercaptans are frequently also present in the synthesis gas, and are likewise absorbed by the methanol and hence separated from the synthesis gas.

The mercaptans present a problem in the workup, effected within the Rectisol process, of the methanol laden by the absorption of the accompanying gases. The sulfur-containing accompanying gases absorbed are separated off by boiling the laden methanol in the column designated "Hot regeneration" by the letter fin the abovementioned FIG. 46. The gas phase that arises as top product from the column, as well as the sulfur-containing accompanying gases, also contains a methanol component which is condensed out in a circuit for the top product and recycled (not shown in this FIG. 46). The mercaptans present in the gas phase are reabsorbed here by the methanol that has condensed out, while the remaining gas comprising mainly carbonyl sulfide (COS) and hydrogen sulfide ($H_2S$) is discharged from the Rectisol process for further treatment. By this procedure, however, the mercaptans and thiophene cannot be removed from the methanol. In order to limit the mercaptan content in the methanol, therefore, a blow-down stream has to date been removed continuously from the methanol and a make-up stream added, which leads to methanol losses. The problem addressed by the invention is therefore that of providing a plant and a process with which it is possible to separate mercaptans and thiophenes from the methanol condensed out of the top product from the hot regeneration column, and at the same time to cause lower methanol losses.

BRIEF DESCRIPTION OF THE DRAWING

For a further understanding of the nature and objects for the present invention, reference should be made to the following detailed description, taken in conjunction with the accompanying drawings, in which like elements are given the same or analogous reference numbers and wherein:
  FIG. 1, shows a flow diagram of an illustrative execution of the plant according to the invention or of the process according to the invention.

DESCRIPTION OF THE INVENTION

The problem is solved by a plant according to claim 1, by use of the plant according to claim 5, and by a process according to claim 10.

Plant According to the Invention

Plant for separation of sulfur-containing components from methanol that has been used as absorbent for scrubbing of synthesis gas, comprising
  a distillation column comprising a feed for the introduction of the laden methanol, an outlet for the methanol that has been freed of its load, an outlet for the top product, a feed for the return of the top product, internals for mass transfer, a heat exchanger for the introduction of heat into the methanol,
  a circuit for the top product, comprising at least one heat exchanger for cooling the top product and for condensing out the condensable components present therein, and a liquid separator for separation of the condensate from the top product, characterized in that the circuit for the top product further comprises a stripping column for separation of volatile components from the condensate, and a heater arranged upstream of the stripper for heating of the condensate.

Preferred Embodiments of the Invention

A preferred configuration of the invention is characterized in that the stripping column contains a random packing or a structured packing, or in that it is equipped with trays. These internals for promoting mass transfer have been found to be useful and are freely available on the market.

A further preferred configuration of the invention is characterized in that the circuit for the top product comprises at least one pump for conveying the return stream. Since there can be a pressure drop in the circuit for the top product in the liquid separator, in this case too, the condensed methanol can be conveyed back into the column by the pump, as return stream.

A further preferred configuration of the invention is characterized in that the circuit for the top product is further equipped with a further cooler and a further liquid separator, where the cooler serves to condense methanol out of the stripped gas, and the liquid separator to separate the condensed methanol from the stripped gas. The condensed methanol is recycled into the stripping column. This measure lowers the loss of methanol caused in the stripping column.

The invention further includes the use of a plant according to the invention as part of a plant for cleaning crude synthesis gas by separating off carbon dioxide and sulfur-containing accompanying gases, wherein cryogenic methanol is used as absorbent, known to the person skilled in the art as the Rectisol process, for separation of sulfur-containing components from the laden methanol, wherein the plant, for cleaning of crude synthesis gas, comprises one scrubbing operation each to separate off the sulfur-containing components in the crude synthesis gas and the carbon dioxide present in the crude synthesis gas, and wherein said plant comprises devices for flashing of the methanol laden in these separation steps.

The scrubbing to separate off carbon dioxide is executed in FIG. 46 of the abovementioned chapter of the Ullmann's Encyclopedia by the column identified by letter b, and the scrubbing for removal of the sulfur-containing accompanying gases by the column identified by a in this FIG. 46.

The distillation column that forms part of the plant of the invention corresponds here to the column for hot regeneration identified by letter f in FIG. 46 of the above-mentioned chapter of the Ullmann's Encyclopedia.

A further preferred configuration of the invention is characterized in that, in this use, the stripping gas used is the gas flashed out of the methanol laden in the Rectisol process. It can be inferred from the abovementioned FIG. 46 of the volume of Ullmann named that the synthesis gas is scrubbed with methanol in a first column identified by a therein, and in a second column identified by b. The methanol laden in the scrubbing operation is led off in each case into a lower portion of the column which is divided in a gas-tight manner from the upper part in which the scrubbing is effected, and it is flashed. The gas flashed off is mixed with the crude synthesis gas again. According to the invention, a substream can be taken from this flashed-off gas and used as stripping gas (not shown in the abovementioned FIG. 46).

A further means of generating a stripping gas for the use according to the invention is to flash it out of the methanol, to flash the methanol coming from the stripper/reabsorber column identified by letters d and e in the abovementioned FIG. 46, before it is introduced into the hot regeneration column identified by f, which corresponds to the distillation column that forms part of the plant according to the invention.

A further preferred configuration of the invention is characterized in that the stripping gas used is the synthesis gas that has been freed of the carbon dioxide and/or of the sulfur-containing components.

A further preferred configuration of the invention is characterized in that the stripping gas used is the gaseous portion of the top product. A substream of this gaseous portion of the top product is compressed at the same time and is recycled to the stripping column.

A further preferred configuration of the invention is characterized in that, when a plant according to the invention is used, the stripping gas used is hydrogen or nitrogen.

The invention further comprises a process for separating sulfur-containing components including $H_2S$, COS, mercaptans and thiophene from a liquid phase comprising mainly methanol, comprising the following process steps:
  introducing the liquid phase into a distillation column,
  distilling the liquid phase while separating off the sulfur-containing components and discharging these components from the distillation column as gaseous top product,
  cooling the top product while condensing out a liquid phase comprising mainly methanol and mercaptans,
  separating the liquid phase from the top product,
  introducing the liquid phase comprising mainly methanol and mercaptans as return stream into the distillation column,
characterized in that the mercaptans are separated by stripping from the condensed liquid phase that has been separated out, forming a gas mixture consisting of the mercaptans and the gas used for stripping, and wherein this gas mixture is sent to a further treatment outside the process.

A preferred configuration of the invention is characterized in that, in the process, the gas mixture is cooled, and a liquid phase comprising mainly methanol is condensed out, separated from the gas mixture and introduced into the liquid phase separated from the top product.

EXAMPLE

Working Example

Further features, advantages and possible applications of the invention are also apparent from the following description of an exemplary embodiment and the drawing. All described and/or depicted features on their own or in any desired combination form the subject-matter of the invention, irrespective of the way in which they are combined in the claims and the way in which said claims refer back to one another.

The invention is to be elucidated hereinafter with reference to the sole drawing, FIG. 1. In the distillation column 1, methanol 2 laden with sulfur-containing accompanying substances, mainly $H_2S$, COS and mercaptans, is freed of these accompanying substances by introduction of heat into the methanol. It is part of a Rectisol plant (not shown here). FIG. 46 in the abovementioned volume of Ullmann's Encyclopedia identifies the corresponding column by the letter f.

The methanol 2 has already been freed of carbon dioxide in preceding steps (not shown here) of the Rectisol process. The methanol 2 is heated by means of steam 3 in the column 1 which drives the volatile, sulfur-containing accompanying substances out of the methanol, and they leave the column 1 as top product 4.

The bottom product 5 obtained is methanol that has been free of accompanying substances and is recycled into the Rectisol process to be used again as absorbent. In the circuit 6 for the top product 4, it is cooled down in multiple stages, and a liquid phase 7 comprising mainly methanol and mercaptans is condensed out, so as to leave a gaseous stream 8 containing mainly $H_2S$ and COS, which is discharged from the plant for further treatment. The cooling and condensation in the heat exchangers 9 and 10 is effected by heat exchange in countercurrent with stream 8, and in the heat exchangers 11 and 12 by cooling with coolants, which are also understood here to mean cooling water and cold water. In the liquid separator 13, the condensate 7 obtained is separated off. It is also possible to lead off the condensate that is obtained in heat exchangers 9 to 12 from said heat exchangers through separate pipelines (not shown in FIG. 1) and combine it with the condensate stream 7. To separate off the mercaptans, the condensate 7 is heated in heat exchanger 14 and introduced into the stripping column 15. A stripping gas stream 16 is used to strip out the mercaptans and thiophenes. The mercaptan stripping gas mixture 17 that arises is cooled down in the cooler 18 in order to condense out entrained methanol 19, which is separated off in the liquid separator 20 and sent to the condensate 7. The mercaptan stripping gas mixture 21 that has been freed of methanol residues 19 is discharged from the liquid separator 20 for further treatment outside the process. It can be sent, for example, to a process for sulfur recovery, for example by the Claus process.

The methanol 22 that has been separated out of the top product 4 and very substantially freed of sulfur-containing accompanying substances, including mercaptans, is discharged from the stripping column 15 and introduced into the distillation column 1.

INDUSTRIAL APPLICABILITY

The invention provides a plant and a process with which the removal of mercaptans from methanol used as absorbent in the Rectisol process is possible, causing only small losses of methanol. This improves the economic viability of the Rectisol process. The invention is therefore industrially applicable.

LIST OF REFERENCE NUMERALS 1 distillation column
2 methanol, laden
3 heating steam
4 top product
5 methanol, cleaned
6 circuit for the top product
7 condensate, containing methanol and mercaptans
8 sulfur-containing accompanying substances, mainly $H_2S$ and COS
9 heat exchanger, cooler
10 heat exchanger, cooler
11 heat exchanger, cooler
12 heat exchanger, cooler
13 liquid separator
14 heat exchanger, heater
15 stripping column
16 stripping gas
17 mercaptan stripping gas mixture with methanol residues
18 heat exchanger, cooler
19 methanol
20 liquid separator
21 mercaptan stripping gas mixture
22 methanol return stream It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A process for separating sulfur-containing components including $H_2S$, COS and mercaptans from a liquid phase comprising mainly methanol, comprising the following process steps:
   introducing the liquid phase into a distillation column,
   distilling the liquid phase thereby producing a first liquid methanol stream and a sulfur-containing component stream,
   cooling the sulfur-containing component stream then introducing the cooled sulfur-containing component stream into a first phase separator, thereby producing a first condensed liquid stream and a gas stream containing $H_2S$ and COS,
   introducing the first condensed liquid stream into a stripping column, thereby producing a mercaptan/stripping gas stream and a liquid methanol stream,
   introducing the liquid methanol stream as a return stream into the distillation column.

2. The process according to claim 1, wherein the mercaptan/stripping gas mixture stream is cooled, and introduced into a second phase separator, thereby producing a methanol stream and a mercaptan rich gas stream, wherein the methanol stream is combined with the first condensed liquid stream.

* * * * *